(12) United States Patent
Gunes

(10) Patent No.: US 7,802,521 B2
(45) Date of Patent: Sep. 28, 2010

(54) SAFETY ENTRANCE NORM (SEN)

(76) Inventor: Bahattin Gunes, 51 Sok 9-3 Birlik Mah, Cankaya-Ankara (TR)

( * ) Notice: Subject to any disclaimer, the term of this patent is extended or adjusted under 35 U.S.C. 154(b) by 339 days.

(21) Appl. No.: 11/910,051

(22) PCT Filed: Mar. 29, 2006

(86) PCT No.: PCT/CA2006/000461

§ 371 (c)(1),
(2), (4) Date: Sep. 28, 2007

(87) PCT Pub. No.: WO2006/102742

PCT Pub. Date: Oct. 5, 2006

(65) Prior Publication Data

US 2009/0165665 A1    Jul. 2, 2009

(30) Foreign Application Priority Data

Mar. 30, 2005    (CA) .................................... 2502537

(51) Int. Cl.
*B61B 1/00*    (2006.01)

(52) U.S. Cl. .................. 104/30; 104/27; 104/28; 105/331; 105/332; 105/333; 105/341; 105/343; 160/327; 404/6; 404/9

(58) Field of Classification Search .............. 104/27, 104/28, 30; 105/331, 332, 333, 339, 341, 105/343; 160/327; 404/6, 9
See application file for complete search history.

(56) References Cited

U.S. PATENT DOCUMENTS

| | | | | | |
|---|---|---|---|---|---|
| 1,259,060 | A | * | 3/1918 | West ............................ | 49/361 |
| 1,442,431 | A | * | 1/1923 | Hoffay ......................... | 104/30 |
| 4,059,194 | A | * | 11/1977 | Barry .......................... | 414/278 |
| 4,082,042 | A | * | 4/1978 | Barry .......................... | 104/18 |
| 4,922,655 | A | * | 5/1990 | Seal ............................ | 49/131 |
| 5,176,082 | A | * | 1/1993 | Chun et al. .................... | 104/28 |
| 5,253,589 | A | * | 10/1993 | Kawanishi et al. ............. | 104/28 |
| 5,295,441 | A | * | 3/1994 | Kawanishi et al. ............. | 104/28 |
| 5,373,120 | A | * | 12/1994 | Barrett et al. ................. | 187/316 |
| 5,626,078 | A | * | 5/1997 | Fuchs .......................... | 104/28 |
| 6,105,905 | A | * | 8/2000 | Spence ........................ | 246/127 |
| 6,227,523 | B1 | * | 5/2001 | Haberlen ...................... | 256/59 |
| 6,414,454 | B1 | * | 7/2002 | Lhotak et al. ................. | 318/266 |
| 7,143,658 | B2 | * | 12/2006 | Schubert ................ | 73/862.632 |
| 7,328,662 | B2 | * | 2/2008 | Kasai et al. .................. | 105/429 |
| 2002/0003065 | A1 | * | 1/2002 | Tonna et al. ................ | 187/324 |

(Continued)

*Primary Examiner*—S. Joseph Morano
*Assistant Examiner*—Jason C Smith
(74) *Attorney, Agent, or Firm*—Egbert Law Offices PLLC

(57) ABSTRACT

The walls in the Unity Platform System are installed all along the platform to match the position of the train doors; on the other hand for different model trains, two new systems which are installed completely free from the train doors have been proposed in the file. The doors with roller bearings move on the seating sledge in the walls. All the doors are attached to one close circle rope, which moves over a pulley set. One drive group activates this rope. The drive group consists of one variable speed reversible motor; one brake and one drive sheave. The rope is pulled to the right or left by the drive sheave. All the doors open or close at the same time, being attached to the same rope. Besides, to bridge the gap between the platform edge and the train, three different Gap Devices have been proposed in the file.

16 Claims, 20 Drawing Sheets

U.S. PATENT DOCUMENTS

| | | | |
|---|---|---|---|
| 2006/0140718 A1* | 6/2006 | Lamore | 404/6 |
| 2006/0147261 A1* | 7/2006 | Wong | 404/6 |
| 2006/0182495 A1* | 8/2006 | Bergendahl et al. | 404/6 |
| 2006/0191749 A1* | 8/2006 | Sasaki et al. | 187/391 |
| 2006/0196733 A1* | 9/2006 | Tonna et al. | 187/315 |
| 2006/0243535 A1* | 11/2006 | Kinoshita et al. | 187/319 |
| 2006/0255937 A1* | 11/2006 | Wong | 340/541 |
| 2007/0258761 A1* | 11/2007 | Orner et al. | 404/6 |
| 2007/0295564 A1* | 12/2007 | Someya | 187/319 |
| 2008/0098924 A1* | 5/2008 | Han | 104/31 |
| 2009/0003932 A1* | 1/2009 | Neusch | 404/6 |
| 2009/0074508 A1* | 3/2009 | Orner et al. | 404/6 |
| 2009/0165665 A1* | 7/2009 | Gunes | 104/30 |

* cited by examiner

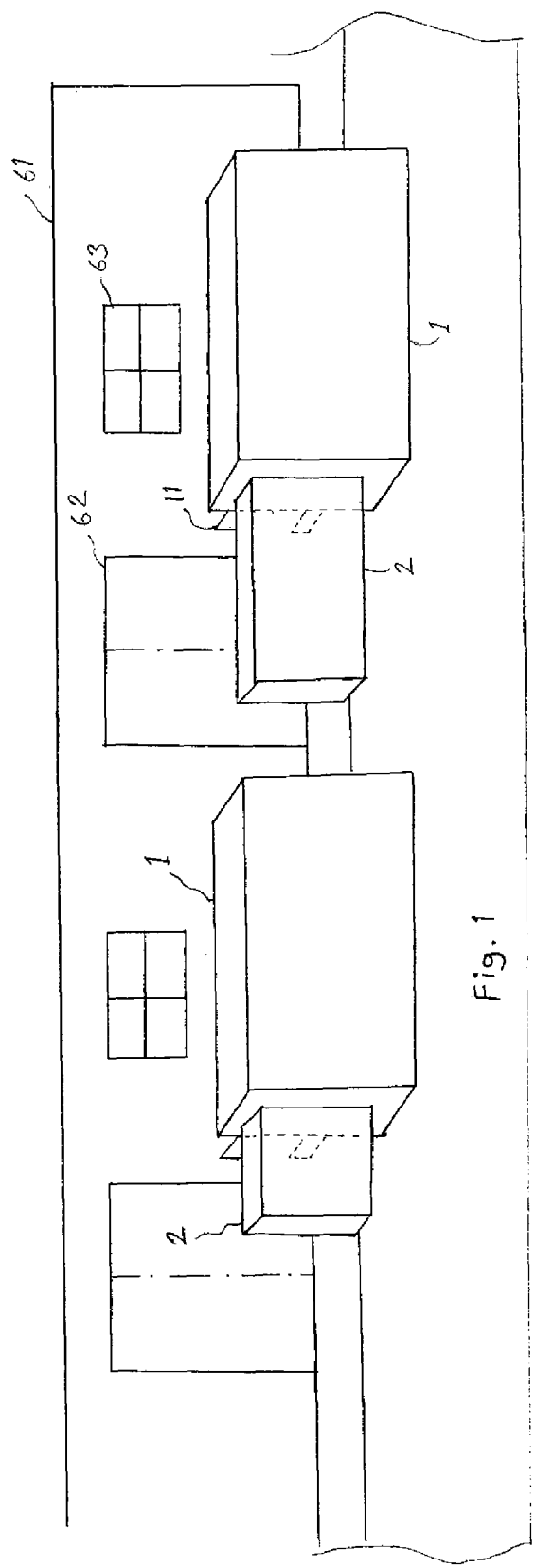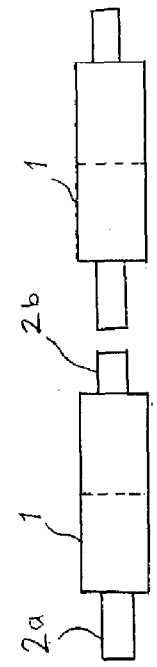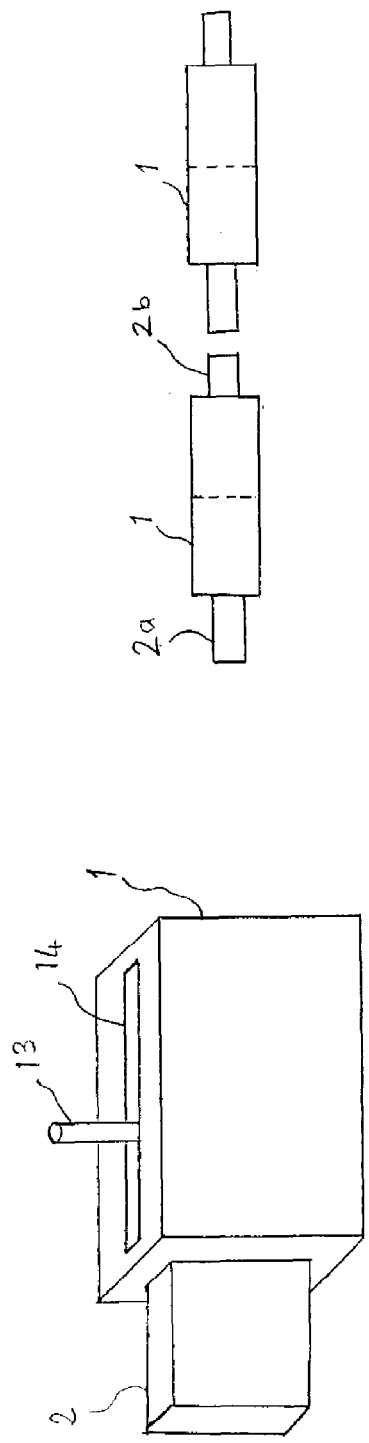

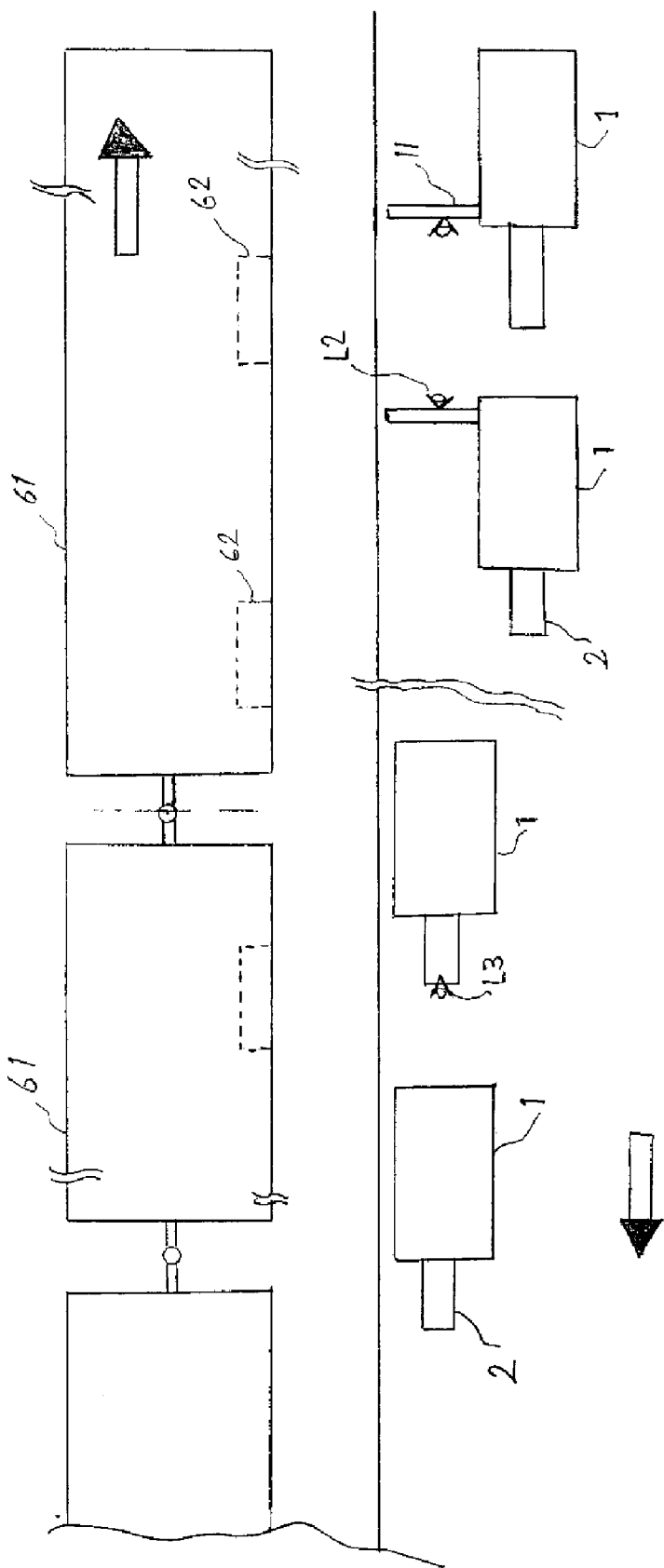

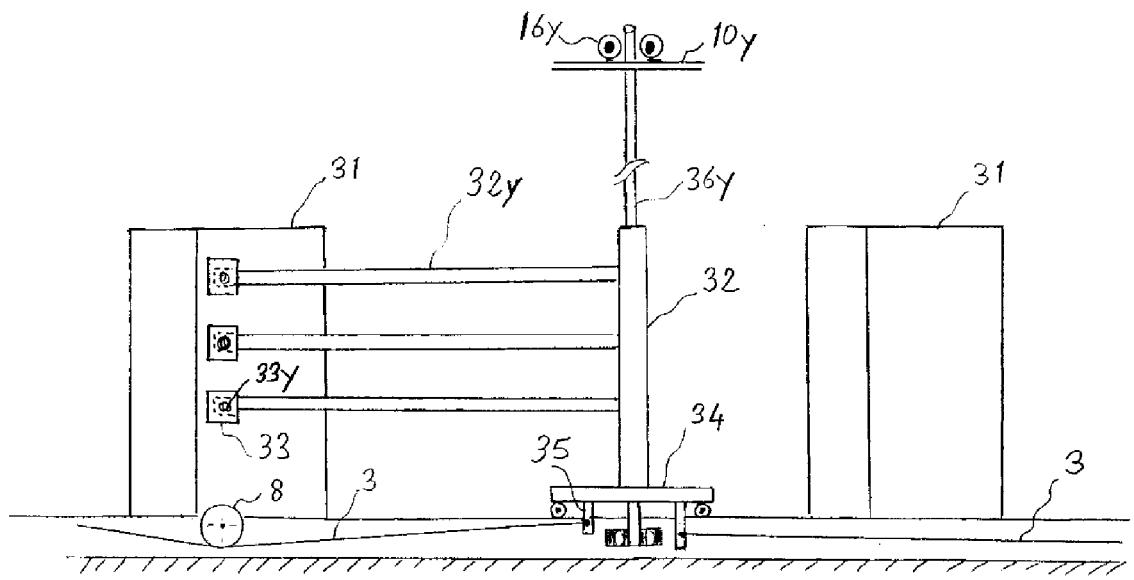
Fig. 21
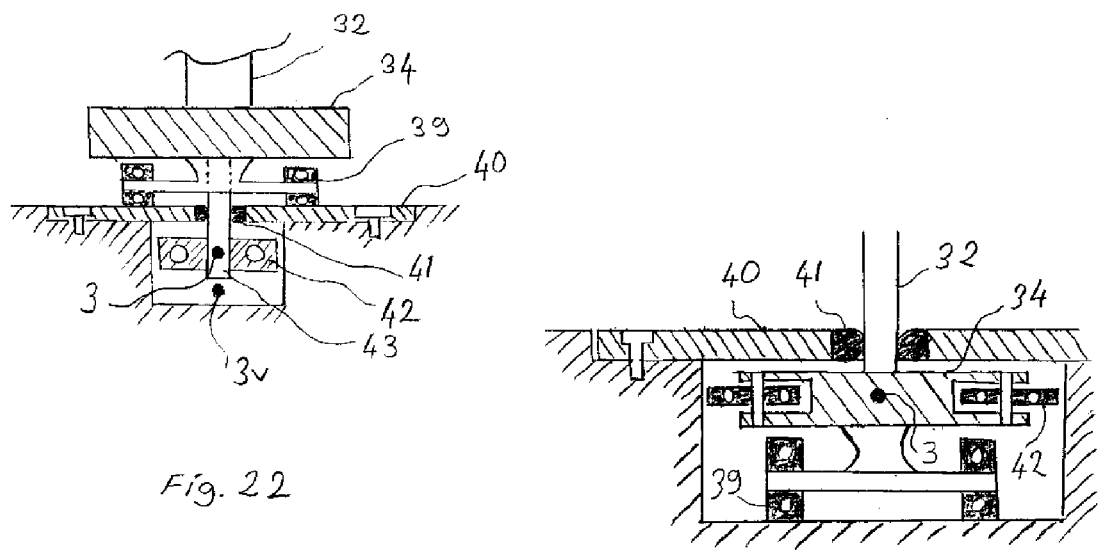
Fig. 22
Fig. 23

US 7,802,521 B2

SAFETY ENTRANCE NORM (SEN)

This application claims the benefit of priority from the international application PCT/CA2006/000461 filed on Mar. 29, 2006, and from the Canadian application 2,502,537 filed on Mar. 30, 2005.

DESCRIPTION

The name of the following invention is Safety Entrance Norm (SEN) and the description of it as below. The SEN provides for passengers getting on/off the trains or subway cars very safely at train platforms. In addition, it will allow the train operator and controller to work with less stress.

It consists of two sections:

A-Rope Activated Platform Systems: This section describes the following systems

A-I Unity Platform System

A-II Double Chamber System

A-III Moveable Stripe System.

B-Movable Gap Bridges: This section describes the three different devices

B-I Rope Activated Gap Device

B-II Pneumatic Activated Gap Device

B-III Normal Gap Devices.

A-Rope Activated Platform Systems:

The purpose of this invention is to prevent the passengers from falling off onto train tracks area when the train is approaching the platform. Because this invention provides that, the platform doors are opened after the train arrives at the platform. These barrier platform systems are installed from wall to wall at the train platform.

One of the following three different systems may be handled depending on the situation. If all the time the same model trains come to the platform, the following system will be the appropriate choice: A-I Unity Platform System. If the trains have different types of cars, the following two systems will be applied: A-II Double Chamber System and A-III Moveable Stripe System.

Presently there is great need for a safe and executable system that will work without problems. The yellow remark line on the edge of the platform cannot protect the passengers from the below mentioned dangerous events. These below events can potentially lead to loss of life. In addition, the institutions who operate train systems need to pay a good deal of insurance.

When the train is approaching the platform, these mentioned events might happen at the platform suddenly. When the passengers are waiting in very crowded conditions while the train is coming into the station, there might be some sudden movement within the crowd to prepare for the boarding the train. At this time, passengers can lose their balance or be caused by the others to fall onto the track. The passengers can be pushed onto the track by another person who is deranged. On the other hand, the passengers can decide to commit suicide by throwing themselves onto the path of the oncoming train. Passengers who do not have good eyesight can fall onto the same area. On the other hand, children and youths can accidentally fall onto the track when they are running, playing or chasing each other.

You can imagine these situations occurring as the train operators and controllers are approaching the platform. Therefore, there is great need to relieve them from these permanent fears, worries and stresses.

A-I Unity Platform System

If the same model trains come to the platform; it means the length of each car, the length of between two cars, and the length between the centerlines of two train doors are the same; the following system will be applied. The width of the train doors is not considered. See the FIG. 4.

The system consists of the following main components:
Stable Walls (walls, 1)
Platform Doors (doors, 2)
Steel Rope (rope, 3)
Drive Group (4)
  Electric Motor, reversible with adjustable frequency controller (v-motor, 5)
  Brake (6)
  Drive Sheave (7)
Pulley Set (8)
Control Panel (9)
Optional Safety Sensors (L)
Other Sensors and Position Switches (S)

The walls (1) are installed along the train platform to match the train doors. Their heights would be considered as near the train windows. (Proposal 100-140 cm.) See the FIG. 1. The walls (1) are installed very near to the edge of the platform (trackside).

As an option, at least one barrier rod (11) is affixed on the walls to enclose the space between the walls and the train to keep the passenger in designated area; or the end of the walls may be extended toward the trackside. See the FIGS. 1 and 4. There is only one door (2) in each wall (1), and it opens to one side. See the FIG. 1.

As an option, we can install two doors in the walls to meet the other door of the adjacent wall, in this way; they would open and close like the train doors. While one door opens to the right, the other door opens to the left, being tied to the return-rope (3v). See the FIGS. 3 and 28.

All the doors (2) connect sequentially to one rope in a closed circle (3), they with roller bearings or sledges move on seating sledges (10) in the walls. See the FIG. 5a.

All the doors (2) are moved to the right or the left at the same time by this rope (3), which is activated by one drive group (4). See the FIG. 27. The rope (3) moves over the pulley set (8), where are mounted in a canal at the bottom of the walls. Thus, the rope goes to the drive group (4) without touching the platform. The rope passes from one wall to the other wall through a canal in the passage area, the canal being provided with a cover (19) that is flush with the platform floor to allow the passengers to pass without any obstacle. See the FIGS. 5a and 5b.

As an option, the rope can pass above the platform floor under an angle-shaped cover (20) to enable installation of the walls without changing the existing platform. See the FIG. 5.

As another option, the rope can work in a canal, which is opened all along the platform, by this way the pulleys (8) in the walls are not required. See the FIGS. 6a and 6b.

The rope (3) attaching to every door (1) with a connector arm (18) which is affixed lower end of each door goes to the last door (2) at the one end of the platform. Then it returns on a tail pulley (8a). After the tail pulley, its name is changed the return-rope (3v). When it reaches to drive group (4) over pulleys, it completes a closed circle. See the FIG. 27. Each door is provided with a counterweight (17) that is mounted on the back of the door to ensure balance and stability and to protect the seating sledges (10) from the force effects. To reach the required tension of the rope, at least one adjustable tension spring (44) or taut screw-nut is incorporated to said rope (3) (optionally with a readable scale). The doors (2) enter smoothly into a slanted/conical nest part (1m) of the other wall while they close; the conical nest part is wider than the door. The ends of the doors are cushioned with appropriate material to ensure silent and smooth closing and opening. The doors move without touching the platform however.

As an option, at least one wheel can be mounted to each door or the doors with roller bearings can move on seating sledges, which placed to the platform floor.

As another option, the doors (2w) can be affixed rigidly on a walking way (46) which is established on the platform, and the doors move with said walking way. At the passage area, this walking way (46) can be flush with the platform floor or the walking way (46) with half T-shaped models doors (2t) mounted in a canal all along the platform and under covers (19w) in the passage area. In this method, the doors (2w) do not connect to the rope (3); the rope is connected to the two ends of the walking way, which moves on carrying rollers (45). See the FIGS. 8, 9, 10 and 11.

The drive group consists of one variable speed reversible motor with an adjustable frequency controller (v-motor, 5); one brake (lock mechanism, 6) and one drive sheave (7). The drive sheave (7) is activated and controlled automatically by a control panel (9), sensors, switches, emergency buttons, optional safety sensors, the v-motor and the brake. See the FIG. 26.

The speed and the direction of the doors are regulated by the electric motor with adjustable frequency controller (v-motor, 5) and the control panel (9). As an option, instead of the v-motor, a normal electric motor and a gearbox can be used.

The train stops at the preset stopping point by taking one sensor signal (s1). Thus, the train doors are lined up precisely with the platform doors (2).

As an option, the train can stop at the preset stopping area without any automation. Because the platform doors are designed wider enough than the train doors to tolerate deviation when the train doors lines up with the platform doors (2). The platform doors (2) may open before the train doors (62) and close when the last car is leaving the platform. As an option, the platform doors (2) can open or close simultaneously with the train doors (62) and with almost the same speed. The platform doors open when the train almost stops or when it stopped.

The control panel (9), taking a signal (s1), gives a command for the doors to open. This command firstly opens the brake (6), and then the v-motor (5) and the drive sheave (7) start up with suitable speed. The drive sheave (7) pulls the rope (3) towards the right or left side by the traction principle, which means transmitting the pulling force to the rope of the system by friction between the grooves in the drive sheave and the rope. Thus, all the doors (2) are opened being attached to the rope. The brake (6) is not active during the open position of the doors.

After all the train doors (62) are fully closed, the train starts to move away. When the last car is about to leave the platform, the control panel (9) receiving a signal (s2), gives a command to close the platform doors (2). In addition, this command makes all optional safety sensors become active while the platform doors (2) are closing.

If the optional safety sensors cannot notice any passengers in the passage areas while the platform doors (2) are closing, the operation continues as follows: While the v-motor (5) and the drive sheave (7) have been rotating inversely with suitable speed, the drive sheave pulls the rope (3) to the other direction. Thus, all the doors (2) close, being tied to the rope. The doors (2) close more slowly than they opened as at least by a one step-pause (proposal: the first step-pause can be taken at ⅓ stage) with some warning sounds and lights.

An S9 limit switch, another S10 limit switch and an S11 magnetic inductive are placed in a designated wall (1) to stop the closing/opening of the platform doors (2). See the FIG. 5a. After the doors (2) are closed, application of the brake (6) can be delayed for a few seconds as a safety measure.

The brief description of the optional safety sensors: If these sensors sense any passengers in the passage areas, they immediately stop the doors and the doors open again. After a few seconds, if some passengers still remain in the passage area, emergency procedures can be applied. After the brake (6) becomes active, the function of the optional safety sensors changes to give the emergency signals instead of opening the platform doors. This new function lasts until a new command comes from a second train to open the platform doors. At least one L1-rod sensor can be affixed to the end of the door toward the trackside. This L1-rod sensor is a touch sensitive type. If it touches a passenger, it can rotate in the direction of the train movement, being mounted on a pivot shaft. It returns to its normal position by a slight spring force. At least one L2-photoelectric sensor can be affixed on the barrier rod. See the FIG. 4. At least one L3-photo electric sensor or touch sensitive type sensor can be affixed to the door end. See the FIGS. 4 and 5a. L-5 plate-weight sensors can be placed in the passage areas. They give signals when they sense a weight over the defined weight. See the FIG. 19. An emergency button can be affixed to every stable wall (1) to open the doors if an emergency occurs while the doors are closing.

As an alternative design, the description of the screen platform doors: See the FIG. 7. The platform doors (2x) can be extended to the height of the train doors (62) and the walls (1x) can be extended to the ceiling; the walls (1s) would also extend over the platform doors to the ceiling. The rope (3) is connected to the top of the doors by connector arms (18x), so the walls can be installed without changing the existing platform. Also in this design, the seating sledges (10x) continue above the doors, thus the doors (2x) open or close in a more stable structure.

Objectives and Advantages: We can assemble the Unity Platform System onto the platform with only slight modifications. It has relatively simple structural design features. We can use a very thin rope (3) and a small powered motor to open or close all the doors together. The total resistance force against the opening and closing is minimal. Because of the small el. motor requires, both energy use and space required is minimal. No heavy machinery is required to mount the motor. The platform doors are designed wider enough than the train doors to tolerate deviation when the train doors lines up with the platform doors (2). Thus, the train can stop at the preset stopping area without any automation. There is only one drive group (4) in this system; this means all the drive mechanism and equipment (electric motor, pneumatic piston, and hydraulic piston, gear-drive mechanism, locking mechanism, power cables, pneumatic pipe/components, hydraulic pipe/components, v-belt, and gearbox) are cancelled in or on each the wall and the door. Only signal cables and equipments may be needed. Thus, the system works as if it has only one door, although it has many doors. The simple design of the walls and the doors prevents the mechanical, electrical, pneumatic troubles, which might occur during the operation of many doors. Thus, there is no reason to speak of the maintenance costs. This system is suitable for subways because it is maintenance-free. Subway platforms involve a high volume of passenger traffic and heavy working conditions. Therefore, there is no the luxury of coping with problems or delays. We can design the width of the walls to be small enough to occupy minimal space on the platform. All the motion equipment like the el. Motor (5), the drive sheave (7), the brake (6), the pulleys (8), the ropes (3) etc., are in enclosed structures. The platform doors (2) can open before the train doors (62) open. Thus, the traffic becomes more comfortable for the passengers. The passengers will not feel double door barriers as they pass. It will seem with an impression as if there are no platform doors. The platform doors (2) can close after the train doors (62) close, particularly when the last car is leaving the platform. This method shall relieve the passengers especially in rush hours. The platform doors (2) close more slowly than they opened as at least by a one step-pause (proposal: the first step pause can be given at ⅓ stage). This way, the passengers who stand in the passage area will have time to move back. After the platform doors are closed, the application of the brake (6) can be delayed for a few seconds for an additional safety measure. Because the height of the walls are near the train windows (proposal 100-130 cm.), the train operator/controller can see the platform and the passengers clearly. In addition, the passengers can see the train is coming and they can see which cars are empty or full. In addition, they will not feel confined behind a high barrier. For an emergency situation, an emergency button can be affixed to one designated wall. It can be always active to open all the doors. For an emergency situation, at least one door-lever (13) is affixed over or any side of a wall as connecting to a platform door (2) to control the opening of the doors (2) manually. One of these door-levers (13) is fixed to a door that is nearest the drive group (4). If for some reason the doors are not opened automatically, pulling a brake-lever on the drive group or commanding a remote control will inactivate the brake (locking mechanism), and then one of the door-levers is pulled to open all the doors. Solving this problem might take a time as only 45-90 sec. See the FIG. 2.

Description of the rock and pinion or V-belt drive group as an alternative. See the FIG. 30: The drive sheave is converted to a rock and pinion drive group or V-belt drive group. A gear (60) is attached to a v-motor directly or by a belt with a pulley. The gear (60) activates a belt (59) or a chain, A-II Double Chamber System Objectives and Advantages: If the train which coming to the platform has different type of cars than the previous one, this system is applied. The train can stop anywhere at the platform and this system does not require any automation system and sensors for the pre-stopping point. The walls (1z) are considered as all the same length (Proposal: 100-300 cm). In this system, there are no barrier rods and L2-sensors on the walls and L1-rod sensors on the doors. The zone between the wall and the train cars is empty. As an alternative, to provide improved traffic flow, the doors can be coded alternately as entrance and exit. One door may be painted green for entrance, the next one painted with a different color as exit. The passengers, who want to get on the train, would wait in front of the green doors. Thus without blocking each other, the passengers will have an improved traffic flow.

This Double Chamber System includes two side-by-side doors (2a, 2b) and two seating sledges in each wall (1z), and each wall is split completely or partly to create two chambers using an interior-wall (1n) between the seating sledges. See the FIG. 12. Because all the walls are the same length, the total passage areas become enlarged and the total wall length becomes shorter. It means the narrow zones between the walls (1z) and the train cars (61) where the passengers can be in motion will become shorter. The walls (1z) are installed on the edge of platform at a distance (a proposal, this distance allows at least two passengers to pass, as 60-150 cm). To minimize the total length of walls on the platform, the doors (2) close as extending a maximum length; this means when the doors are close position, the remained part of the doors in the wall (1z) should be minimum length; so that their designs are adjusted to each other for optimum compatibility.

As one of the doors attached to the rope (3) closes to the right, the other door closes to the left, being attached to the return-rope (3v). See the FIG. 29. The doors close to the right and the left and meet with the other adjacent doors. Their ends are L-shaped to create stability when they touch each other. See the FIG. 13a. As an option, the rope (3) and the return-rope (3v) can pass diagonally in the passage area, so that the doors can attach alternately to the ropes in the walls (or just in the walls the doors can attach to the ropes alternately). See the FIG. 14b. As a result, alternated doors will move in the desired direction, since their end will meet each other precisely in the same line (by this method the L-shape is not necessary for the end of the doors). See the FIG. 13b.

The optional safety sensors, L4-light curtains (beam) safety sensors can be placed at the ends of the platform to scan the zone between the train and the walls (1z); or the L-5 plate-weight safety sensors can be placed in the zone between the train and the walls all along the platform. See the FIGS. 18 and 20.

As an alternative, the description of the in-doors: See FIGS. 15 and 16. An in-door (2p) by fence-shaped or plaited or the same shape with the door (2) can be installed inside the platform door (2). This time the rope (3) is connected to the in-door (2p), and the rope works in a channel all along the platform; this channel can be open or covered using a flexible rubber that allows the connector arm to move. As an option, at least one wheel (12) can be mounted to the door (2). As an option, from the upper end of the platform door and/or in-door (2p), the door shafts can be extended to the ceiling and seated on the ceiling with at least a roller bearing (16p) on a seating sledge (10p). As an option, the rope (3) can be operated in a structure on the ceiling, and the in-doors (2p) connect to the rope on the ceiling so the walls are installed easily on the platform floor without changing the platform. All these changes will not affect the other aspects of Unity Platform System, thus all the other parts of the automations and the components and the designs which will be required for Double Chamber System will be considered as the same as Unity Platform System.

A-III Moveable Strip System, See the FIG. 21.

Objectives and Advantages: The purpose of this system is the same as the Double Chamber System. If the train which coming to the platform has different type of cars than the previous one, this system is applied. The train can stop anywhere at the platform and this system does not require any automation system and sensors for the pre-stopping point. In the open position of the door, the platform walls appear to be nearly withdrawn from the platform. The total passage area approaches nearly the total walls length. It seems as if there are no any barriers when the passengers get on/off the train. This system provides a more comfortable traffic for the passengers. The walls (consoles, 31) can be established very close to the edge of platform. Thus, the platform area which using by the passengers becomes wider.

In this system, we convert the walls (1) to consoles (31) which lengths are much shorter than the walls (1z). Also, the doors (2) are converted console-doors (32) and strips (32y). The consoles (31) are installed with all the same dimensions and at equal distance from each other on the platform (proposal distance, 120-600 cm).

At least one strip box (33) is placed in each console (31). The strips (32y) can be wrapped by spring forces (33y), which in these strip boxes. (They are like a safety belt in an automobile.) As an option, the strips would be retracted by a chain/belt (38) and gear mechanism (37), which is activated by the re-turned rope (3v) in the console (31). One end of these strips (32y) is attached to the doors. The console-doors are connected to the rope (3) in a closed circle. While the rope (3) is being pulled to the right or left, the console doors (32) will open or close. While the console doors close, the strips (32y) become to extended position. Inversely, while the doors open, the strips are automatically wrapped by spring force in the strip boxes (33).

The doors (32) are mounted on a heavy metal plate (34), which has at least two wheels (like a skateboard). The heavy plate provides balance and easy travel on the platform for the doors. As an option, the heavy plate can move in a bigger and wider canal just below the surface of the platform. See the FIG. 23.

At least one shaft (35) is extended under the heavy plate to attach to the rope (3) in the canal and at least one horizontal guide bearing (42) is attached to the same shaft or another shaft (43). The horizontal bearing guides the console doors to move in a straight line in the canal. See the FIG. 22.

Two cover plates (40) are placed over the canal, allowing a gap, which is a little bigger than the diameter of the shafts (42). This gap can be open or covered by a very flexible rubber (41), which allows the shaft to move. These cover plates and the guide bearings keep the console doors (32) upright while they are moving.

Except during motion, the console doors (32) are always seated and guarded in the appropriate nest in the console (31). As an alternative, from the upper end of the doors, a shaft (36y) can extend to the ceiling of the platform. This shaft moves with at least one roller bearing on a seating sledge (10y) there. Thus, the doors would open or close in a more stable structure.

All these changes will not affect the other aspects of Unity Platform System, thus all the other parts of the automations and the components and the designs which will be required for this system will be considered as the same as Unity Platform System.

B-Movable Gap Bridges:

The purpose of this section is to make a bridge for the gap between the platform edge and the train doors (62); one or more gap device is installed on the platform edge in front of the platform doors (2) for the same model trains. On the other hand, they are installed all along the platform edge for different model trains. See the FIGS. 31, 32, and 37.

We will describe the three different models on this section.

B-I Rope Activated Gap Device

B-II Pneumatic Activated Gap Device

B-III Normal Gap Devices

B-I Rope Activated Gap Device

This consists of the following main components. See the FIG. 33 and FIG. 34.
  Sledge Housing (71)
  Sledge (72)
  Steel Rope (rope) (73)
  Drive Group (74)
    Frequency Controlled Electric Motor (v-motor, 75)
    Brake (76)
    Drive Sheave (77)
  Pulley Set (78)
  Control Panel (9)
  Spring (80)
  The roller bearing for oval and plain side (81)
  The roller bearing for guidance side (82)
  Sensor and Position Switches (S)

The system consists of sledge housings (housings, 71) and sledges (72), all the sledges move on the housings, which are fixed to the platform floor.

All the sledges connect sequentially to one close-loop steel rope (rope, 73) which is activated by a drive group (74). FIG. 33. The sledges connect to the closed-rope (73) with short-ropes (83) which are tied to the sledges (72) by at least one swivel joint (99); they pass over a pulley (78c) on the middle-back of the housing; then connect to the closed-rope (73). The closed-rope (73) is supported and guided by two pulleys (78) on the back of the housing. When the drive sheave (77) pulls the closed-rope to the right or left, all the sledges are withdrawn or released.

The drive group consists of one variable speed reversible motor with adjustable frequency controller (v-motor, 75), one brake (lock mechanism, 76), and one drive sheave (77). As an option, instead of the v-motor, a normal electric motor and a gearbox can be used.

All the sledges are released or withdrawn at the same time, being attached to the same rope (73). See the FIG. 33. The speeds of the sledges are regulated by the v-motor (75) and control panel (9). The drive sheave (77) is activated and controlled automatically by the control panel (9), sensors and switches, the v-motor (75) and the brake (76). We can use the same control panel (9) which is used in the Unity Platform System. The sledges in the resting positions (withdrawn position) fill some part of the gap (proposal: percentage 50-75). Therefore, the movement of the sledge will be minimal, thus saving energy and the action will happen faster. See the FIG. 37.

After the train arrives at the platform; the rope and the sledges are released when the train stops or when the train doors open. The control panel receiving a sensor signals (s3) gives the sledges a command to release, after the brake becomes inactive, the rope and the sledges are released. The released sledges (72) are forced by the springs (80) in the housing (71) to move towards the train until they touch beneath the train door. As a result, the gap is bridged completely.

After passengers have entered and exited, the sledges (72) are withdrawn, when the train doors (62) close. The control panel receiving another sensor signal (s4) gives the sledges a command to withdraw.

When the drive sheave (77) start up inversely with suitable speed pulls the steel rope (73). Thus, all the sledges attached to the rope (73) by the short ropes (83) come to the resting positions. Then the brake (76) becomes active to hold the rope and the sledges in an immobile position. A limit switch ends the withdrawal. Thus, the train in motion has not touched to the sledges (72) while arriving and leaving. The sledges only contact the train when it is stationary.

The rope (73) pulls the sledge over the pulley (78c) affixed to the back of the housing (71). Then the rope passes to the other sledges over the other two pulleys (78), which are affixed to the back of the housing (71). The rope goes to the drive group (74) over the pulley set without touching the platform floor. The rope (73) attaching to every sledge (72 with a short rope (83) goes to the last sledge (72) at the end of the platform. Then it returns on a tail pulley (78a). After the tail pulley, its name is changed the return-rope (73v). When it reaches to drive group (74) over pulleys, it completes a closed circle. See the FIG. 33.

The side facing the approaching train of the sledge is curved, oval or angled. Many roller bearings (81) are placed very close to each other in this part (like on a roller blade). In addition, the same model roller bearings (81) are placed in the plain side (facing the train) of the sledges with suitable spaces. All these roller bearings are coated with appropriate rubber. See FIG. 34.

To force the sledge forward, at least two springs (80) are placed between the housing and the sledge. The springs contact the sledge (72) in a recessed space. Limit studs (95) end the forward position of the sledges. For this purpose, there are limit holes (86) on the sledges and there is at least one canal (84) on the housing. The limit studs move inside this canal until they stop.

There is at least one oiling canal (85) on the housing (71) which lubricate the sledges (72) to reduce friction. At least one swivel joint (99) is placed in a recessed space in the sledge (72). There are also two pulleys (78) on the back of the housing. The housing (71) is fixed to the platform floor through the fixing holes (87). The inside of the housing is higher than the sledge height. Thus when the upper cover (91) is put on the housing (71), a small space remains which is enough for the sledges (72) to move forward or back. This space is so small that it does not allow the sledge to move up or down.

The end of this cover (91) is slope-shape to not hinder the passengers. A rubber seal (91m) is mounted to the end of the upper cover (91) to prevent particles from entering into the housing. The surface of the upper cover may be considered as rough to provide traction. See the FIG. 36.

Even if the sledges (72) cannot be withdrawn to the resting position for some reason: The train touches firstly the angle side of the sledge and slide over the roller bearings (81) very smoothly while pushing the sledge back. Then the train passes to the plain side of the sledge. As an option, similar roller bearings (82) are placed on each inside of the sledges (72). They move in the housing (71). They are coated with more elastic rubber to cushion to the forces from the train touches. In addition, they provide the sledges (72) to withdraw easily. When the train touches the sledges (72), it presses the sledges back only overcoming the spring forces. Therefore, the coming forces to train are only the spring forces (80). As a result, the trains are not damaged by touching the sledges (72).

Objectives and Advantages: There is only one drive group in this system; this means all the drive mechanism and equipment (electric motor, pneumatic piston, and hydraulic piston, gear-drive mechanism, locking mechanism, power cables, pneumatic pipe/components, hydraulic pipe/components, v-belt, and gearbox) are cancelled in or on the Gap Devices. Thus, the system works as if it has only one sledge (72), although it has many sledges. The simple design of the housing and the sledges prevents the mechanical, electrical, pneumatic troubles, which might occur with the operation of many sledges. Thus, there is no reason to speak of the maintenance costs. This system is suitable for subways because it is maintenance-free. Because subway platforms involve high volumes of passenger traffic and heavy working conditions. It means there is not the luxury of coping with problems or delays.

All the motion equipment like the el. motor, the drive sheave, the brake, the pulleys, the ropes etc. are in enclosed structures. The train in motion has not touched to the sledges while arriving and leaving. So the sledges only contact to the train when the train is stationary. Even if the sledges cannot be withdrawn to the resting position for some reason, the trains are not damaged by touching the sledges.

B-II Pneumatic Activated Gap Device.

Objectives and Advantages: To activate the sledges; at least one effective, pressurized-air piston or hydraulic piston is used. The rope (73) and the pulley set are cancelled.

There is a middle-wall (90) in the housing in this model. Two screw-rods (88) pass through the holes on the middle wall and inside of the springs connect to sledge in the recessed space. The holes on the middle wall, which the screw rods pass, are oval shaped to allow a little movement to the right or left. See the FIGS. 38, 39 and 40. The limit of the sledge movements is adjusted using two nuts (89) on these screw rods considering the middle-wall as the reference point. There is no need for limit studs and holes and canals in this model. The springs (80) work between the middle wall and the sledge (72). If more springs are required, they are placed between the middle wall and the sledge without using more screw rods.

At least one pneumatic/hydraulic piston (97) is placed on the middle wall (90). The piston shafts (97m) pass through the holes on the middle wall and connect the sledge with swivel joints (97z) in the recessed space. See the FIG. 40.

To activate the sledges, one effective pressurized-air line or one hydraulic line (98) comes to the pistons (97). The drive group (74) comprises of a compressor or a hydraulic pump with a tank and control valves. We do not need the rope, the drive sheave and the brake.

Every sledge (72) is attached to at least one pneumatic/hydraulic piston; these pistons (97) hold the sledges in the withdrawn position or released position. The sledges (72) in the resting positions fill some part of the gap (proposal: percentage 50-75) by the force of the piston.

These changes will not affect the other aspects of the Rope Activated Gap Device, thus all the other parts of the automations and the components and the designs, which will be required for this system, will be considered as the same as with Rope Activated Gap Device.

B-III Normal Gap Devices

Objectives and Advantages: There are no required any power source, drive mechanism and automation system in these models. This means the drive groups (74), the control panel (9), the rope (73), the pulleys (78); the hydraulic/pneumatic pistons (97) with all equipments are cancelled. The simple application of these models prevents problems.

These Gap Devices (70) are mounted on the platform to accommodate a reference train, which the most commonly used train. So that the sledges are adjusted to almost fill the gap (proposal percentage 95-98) using the limit nuts (89) on the screw rod (88) or the limit studs (95). See the FIGS. 34 and 38. If the reference train comes to the platform, it stops without touching the sledges (72). If a narrower train comes to the platform, it stops again without touching the sledges (72), This time we might not able to fill all of the gap, however at least more than half of the gap is filled. If a wider train comes to the platform, the train touches firstly the angle side of the sledge (72) and slide over the roller bearing (81) very smoothly while pushing the sledge back, which explained in the Rope Activated Gap Device. As a result, the gap clearance will be bridged completely.

These changes will not affect the other aspects of the Rope Activated Gap Device and Pneumatic Activated Gap Device, thus all the other parts of the components and the designs which will be required for this system will be considered as the same as with the Rope Activated Gap Device and Pneumatic Activated Gap Device.

BRIEF DESCRIPTION OF THE DRAWINGS

A-I: Unity Platform S.
A-II: Double Chamber S.
A-III: Moveable Stripe S.
B-I: Rope Activated Gap D.
B-II: Pneumatic Activated Gap D.
B-III: Normal Gap D.

FIG. 1 shows a prospective view in A-I. The walls (1) are installed all along the train platform to match the position of the train doors. The platform doors (2) works in the walls.

FIG. 2 shows a prospective view in A-I. The door-lever (13) is shown. It opens all the doors in emergency.

FIG. 3 shows a top view in A-I. The two doors (2) in the walls (1).

FIG. 4 shows a top view in A-I. The walls, the doors, the barrier rods (11) are shown according the train (61). Alternatively, the walls are installed very near to the platform edge without the barrier rods.

FIG. 23 shows a side sectional view in A-III. The heavy plate (34) is in the canal just below the surface of the platform.

Figure 5A:
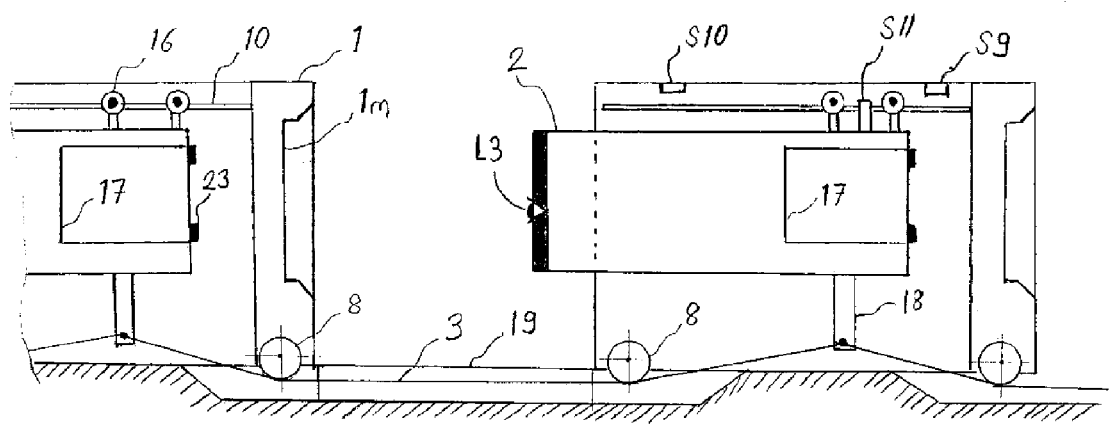
FIG. 5a shows a front sectional view in A-I. The doors are connected the rope (3). The walls, the doors, the pulleys (8), the rope (3), the counterweight (17), the seating sledge (10), the roller bearings (16) and the passage area are shown.
Figures 5B, 5C, 5D:
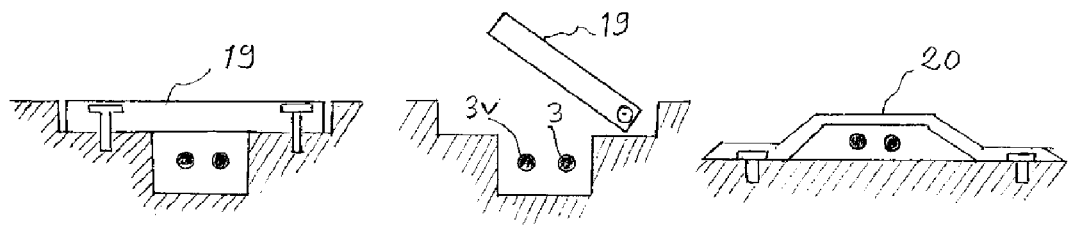
FIGS. 5b and 5c and 5d show sectional views in A-I. The rope (3) and the re-turn rope (3v) pass in canal under a cover (19) or above the platform floor under an angle-shaped cover (20).
Figure 6A:
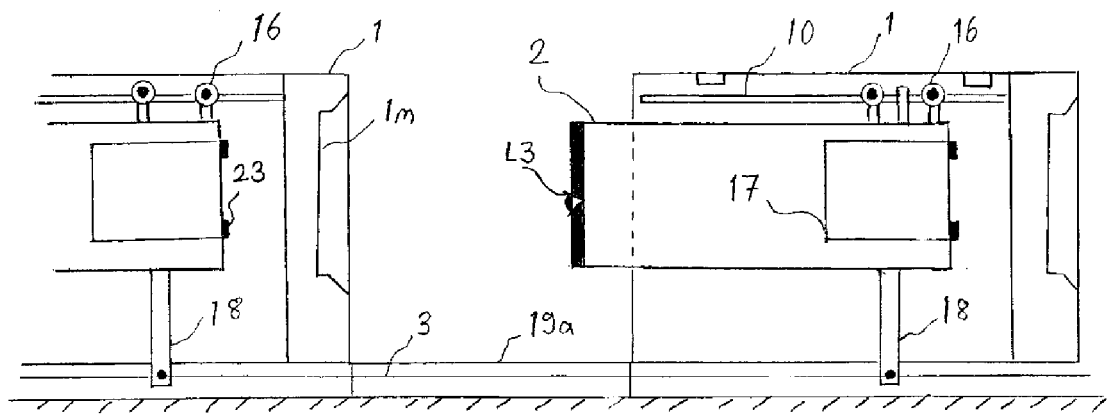
FIGS. 6a and 6b show side sectional views in A-I. The rope (3) without using the pulleys (8) in the walls works in the canal, which opened all along the platform.
Figure 6B:
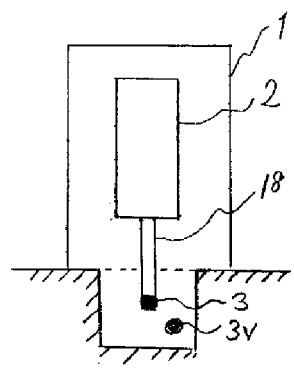
Figure 7:
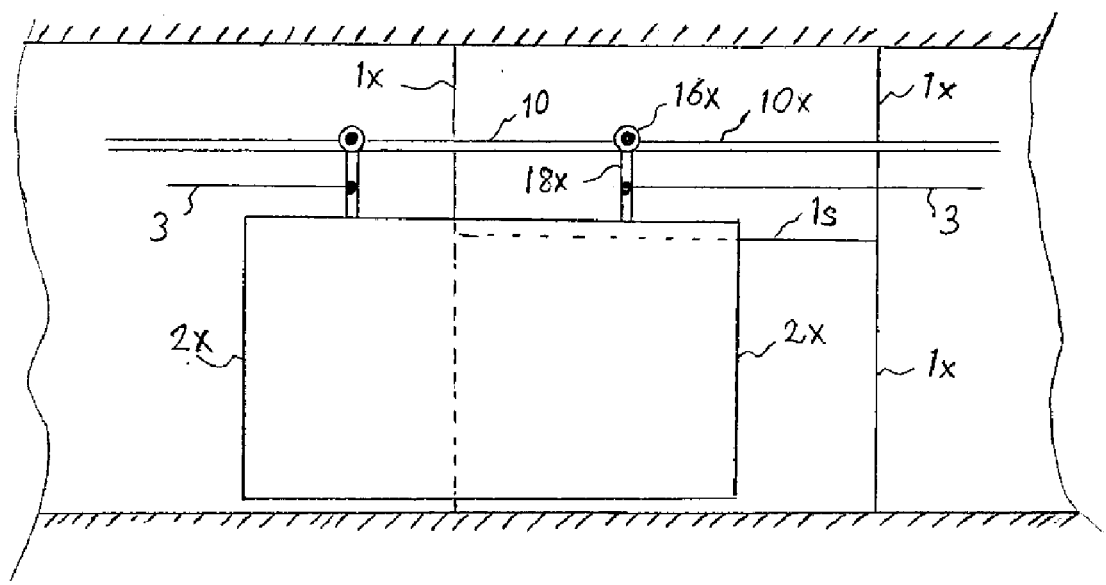
FIG. 7 shows a front sectional view in A-I. The walls (1x) are extended to the ceiling and the platform doors (2x) are extended to the height of the train doors. Also the spaces over the doors (2x) are covered by the walls (is). Beside the rope (3), the seating sledge (10x), the roller bearings (16x) and the passage area are shown.
Figure 8:
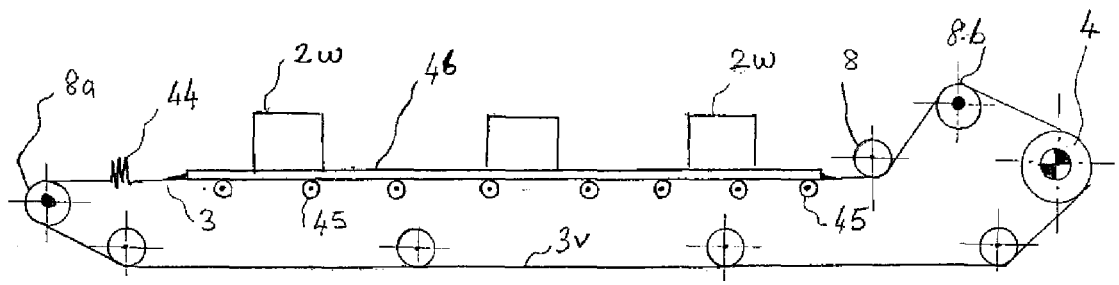
FIGS. 8, 9, 10, and 11 show schematic scales in A-I. The doors (2) are affixed rigidly to a walking way (46). The rope (3) connect to the two ends of the walking way (46).
Figure 9:
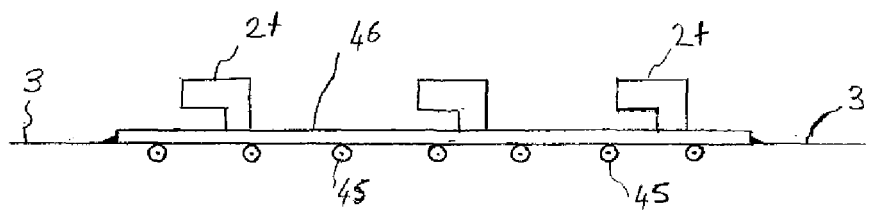
Figure 10:
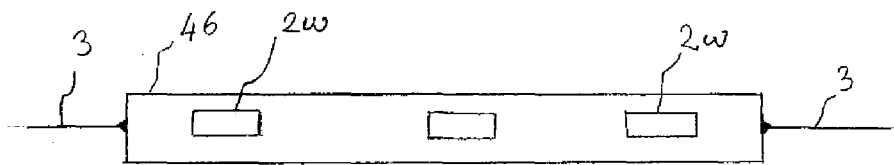
Figure 11:
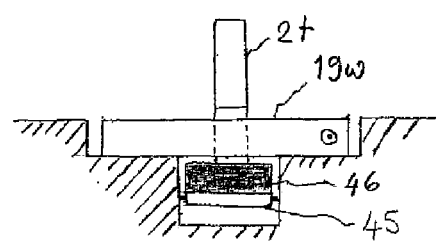
Figure 12:
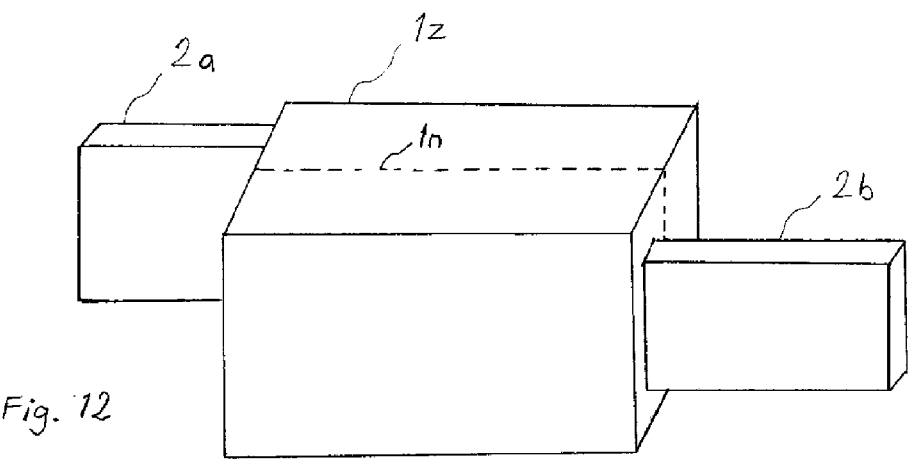
FIG. 12 shows a prospective view in A-II. Two side-by-side doors in each wall (1z).
Figure 13A:
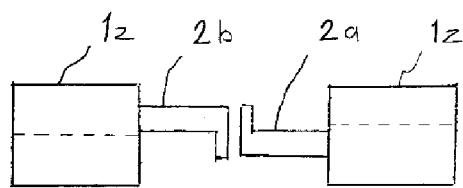
FIG. 13a shows a top view in A-II. The L-shape doors (2a, 2b).
Figure 14A:
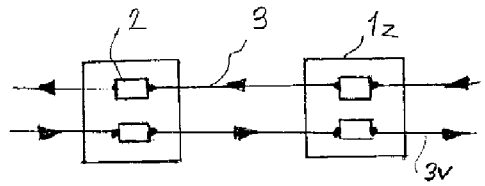
FIG. 14a shows a top schematic scale in A-II. The rope (3) and the return rope (3v) pass in the canal directly.
Figure 13B:
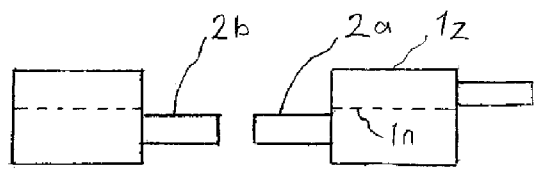
FIG. 13b shows a top schematic scale in A-II. The doors meet each other precisely in the same line.
Figure 14B:
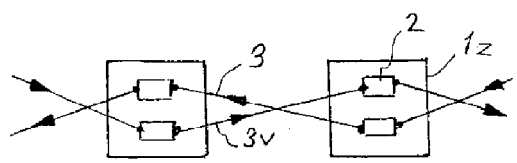
FIG. 14b shows a top schematic scale in A-II. The rope (3) and the return rope (3v) pass diagonally in the canal, and the doors attach alternately to the ropes (3 and 3v) in the walls.
Figure 15:
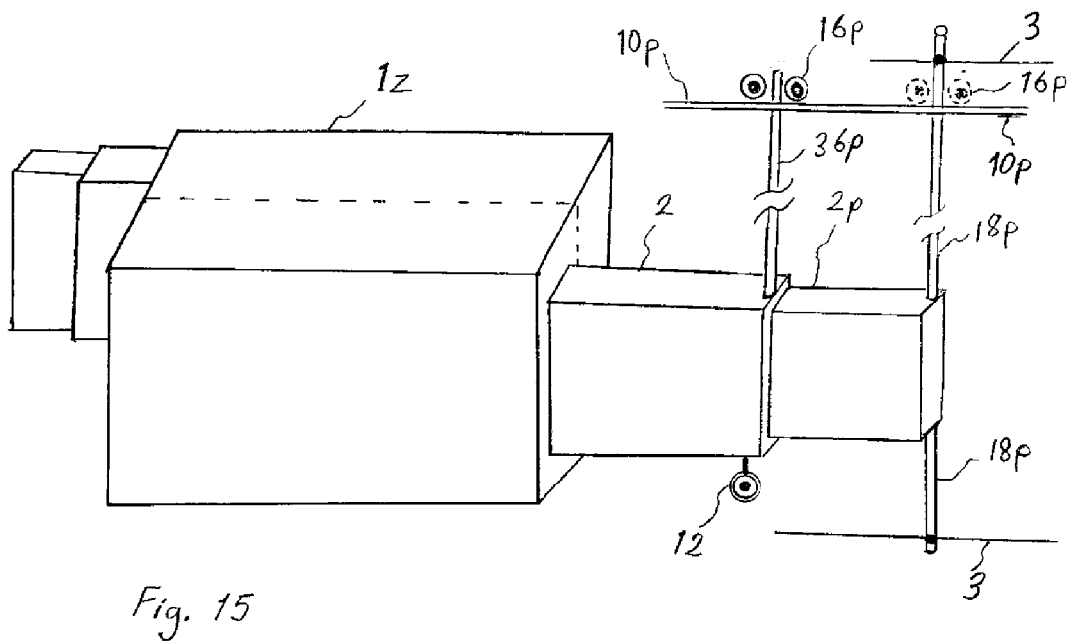
FIG. 15 shows a prospective view in A-II. The in-door (2p) is in the door (2). The rope (3) connect to the connector arm (18p) underside the in-door. The door shaft (36p) or the connector arm (18p) can be extended to the ceiling and seated on the ceiling.
Figure 16:
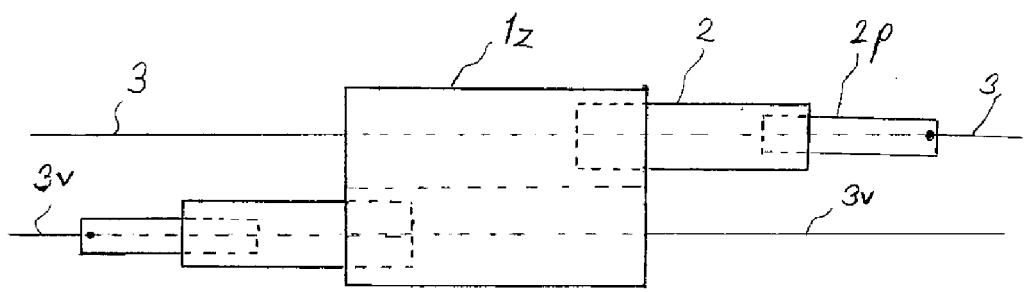
FIG. 16 shows a top view in A-II. The rope (3) and the re-turn rope (3v) connect to the in-doors (2p).
Figures 17A, 17B:
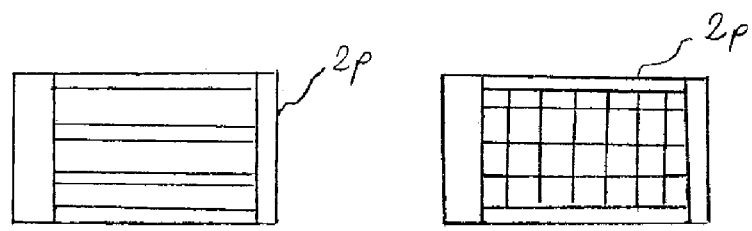
FIGS. 17a, 17b show front views in A-II. Different models of the in-door (2p).
Figure 18:
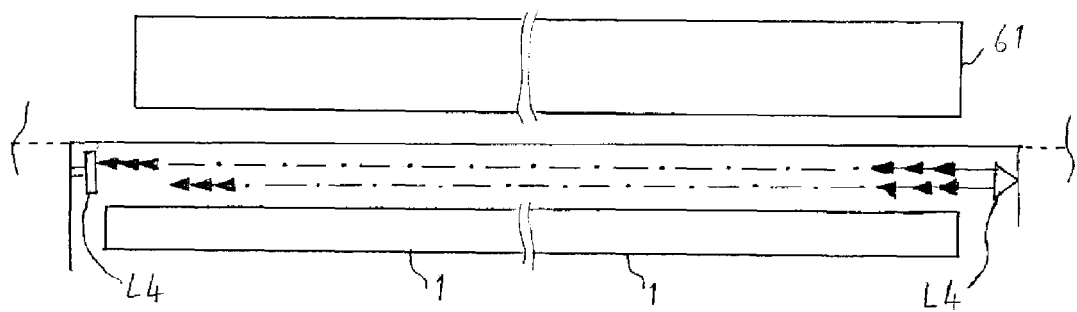
FIG. 18 show top views in A-II. The L4-light curtains (beam) safety sensors at the ends of the platform to scan the zone between the train and the walls (1z).
Figure 19:
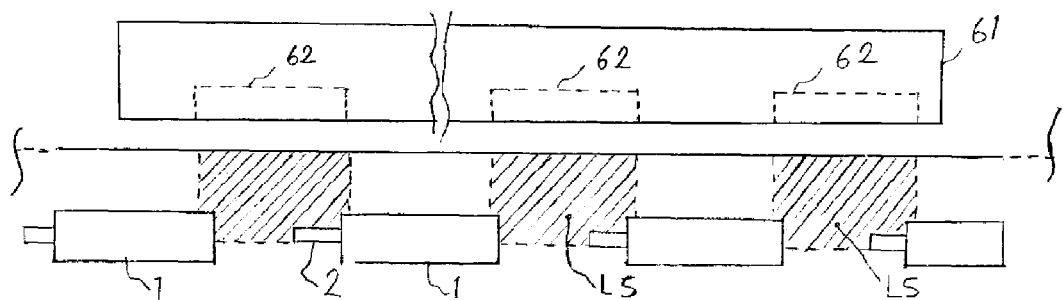
FIG. 19 shows a top view in A-I. The L-5 plate-weight safety sensors in the passage area
Figure 20:
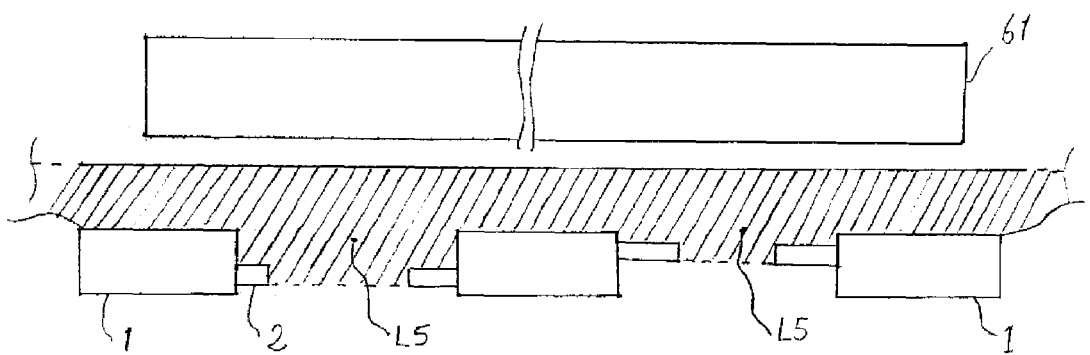
FIG. 20 shows a top view in A-II. The L-5 plate-weight safety sensors in the zone between the train and the walls (1) all along the platform.
Figure 21:
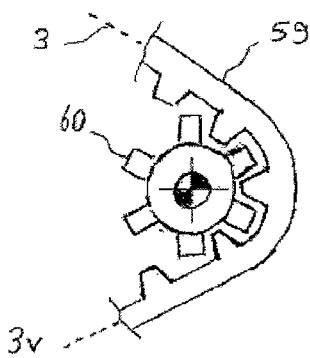
FIG. 21 shows a front sectional view in A-III. The console (31), the console doors (32), the heavy plate (34), the strips (32y) and the rope (3) and the passage area are shown.
Figure 22:
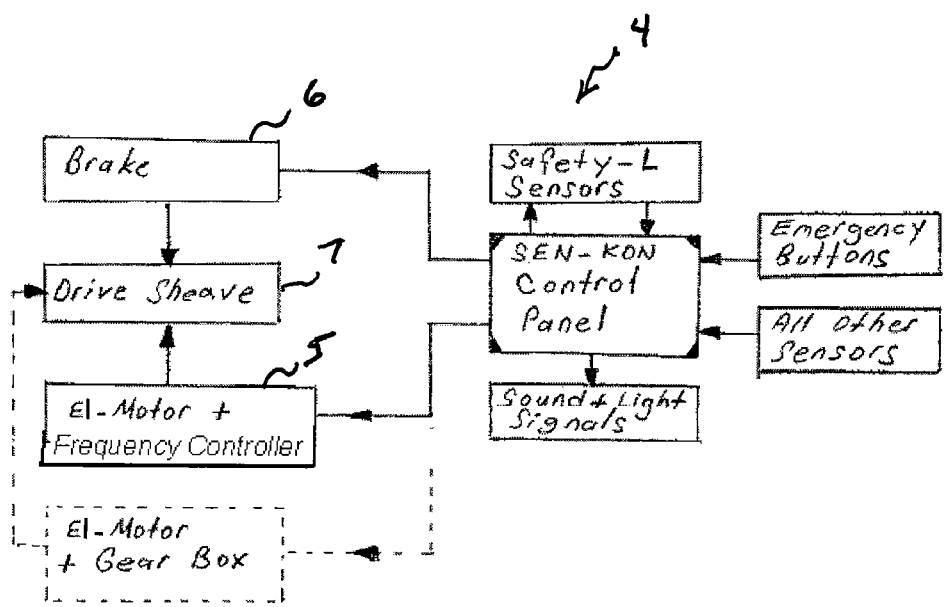
FIG. 22 shows a side sectional view in A-III. The rope (3), the re-turn rope (3v) and the horizontal guide bearing (42) is attached to the shafts (43) extended under the heavy plate (34) in the canal
Figure 24:
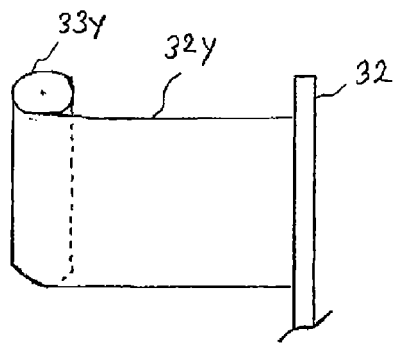
FIG. 24 shows a front view in A-III. A strip (32y), which can be wrapped by spring force in the strip boxes (33y) and a console door, are shown.
Figure 25:
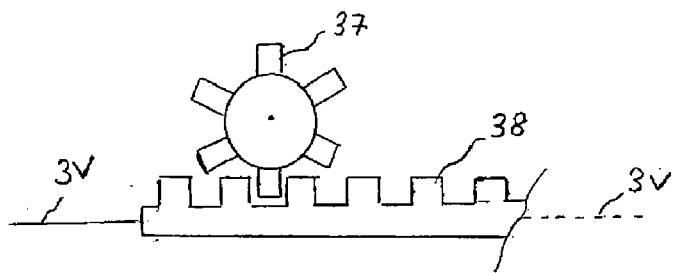
FIG. 25 shows a top view in A-III. The strips (32y) are wrapped by a chain/belt (38) and a gear mechanism (37) in the console (31).
Figure 26:
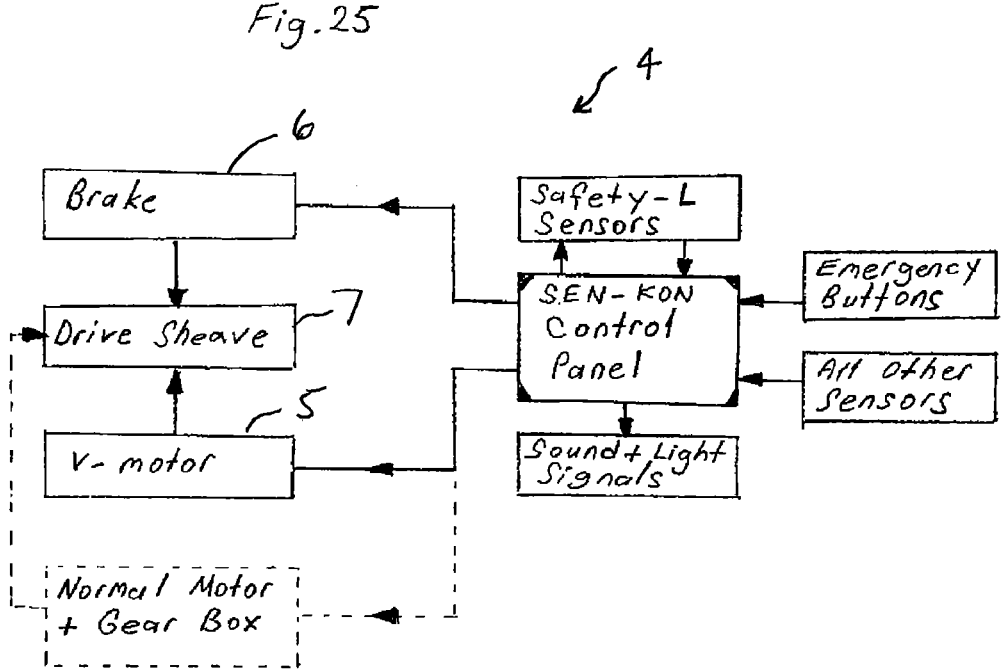
FIG. 26 shows a control system schematic scale in A-I. The control panel operates the system automatically by receiving signals from the optional safety sensors, the other sensors and switches and the emergency buttons. It controls the v-motor (5) and the drive sheave (7), the brake (6), the sound and light warning signals, and the optional safety sensors. As an option, a normal el. motor and a gearbox can be used instead of the v-motor (5)
Figure 27:
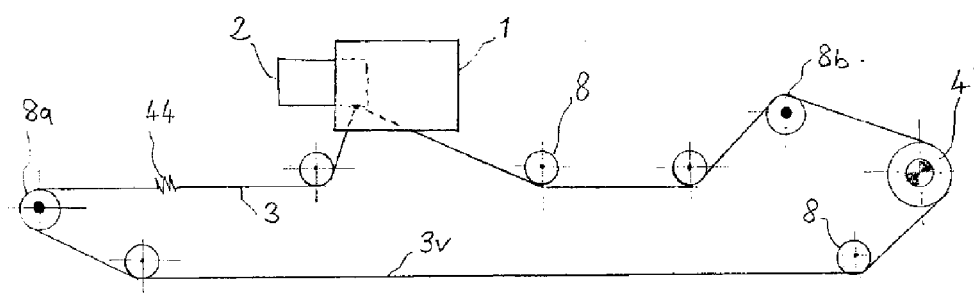
FIG. 27 shows a schematic scale in A-I. In the closed circle drive system, the rope (3) are connected every door then the tension spring (44). Then the rope returns on a tail pulley (8a) reaches the drive group (4) over the pulleys (8).
Figure 28:
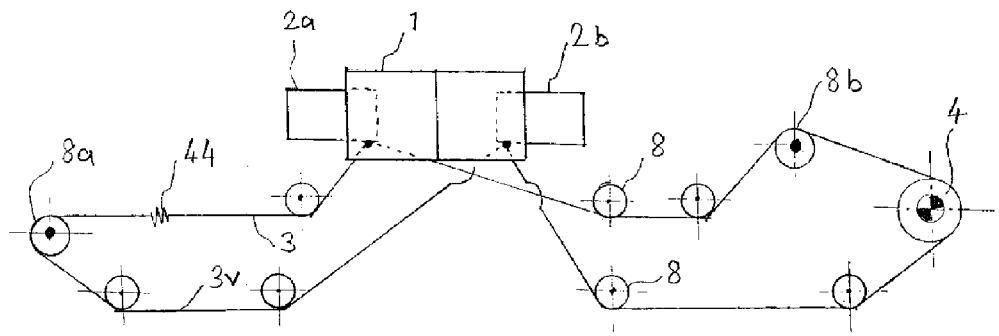
FIG. 28 shows a schematic scale in A-I. The closed circle drive system for two doors (2) in the walls. While one door (2a) opens to the left, the other door (2b) opens to the right, being connected to the return-rope (3v)
Figure 29:
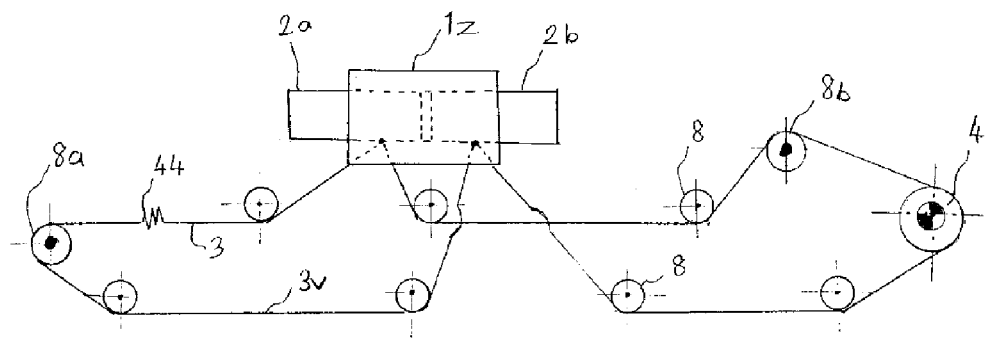
FIG. 29 shows a schematic scale in A-II. The closed circle drive system for two side-by-side doors in the walls (1z). While one door opens to the left, the other door opens to the right being connected to the return-rope (3v).
Figure 30:
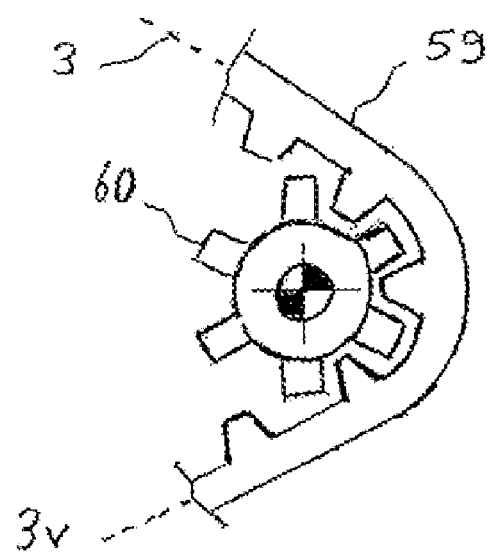
FIG. 30 shows a schematic scale in A-I. Rock and Pinion or V-belt Drive Group; the drive group is converted to a gear (60), which is attached to a v-motor (5) directly or by a belt with a pulley. It activates a belt or a chain (59).
Figure 31:
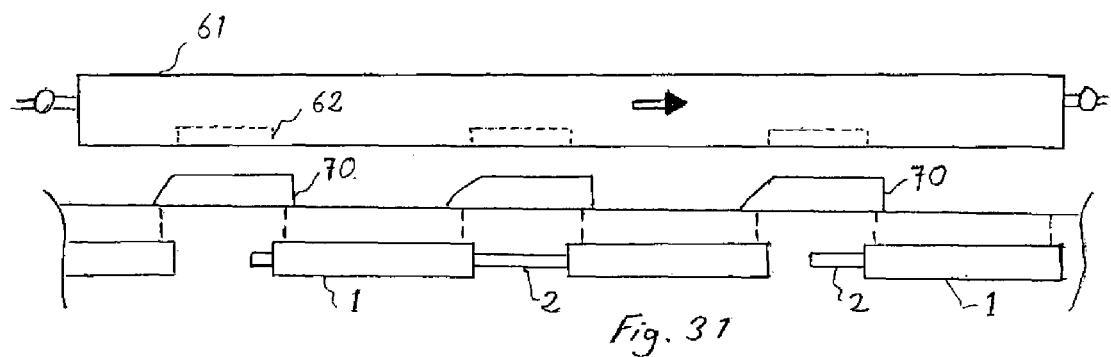
FIG. 31 shows a top view for general. The gap devices (70) are installed in front of the platform doors (2) for the same model trains.
Figure 32:
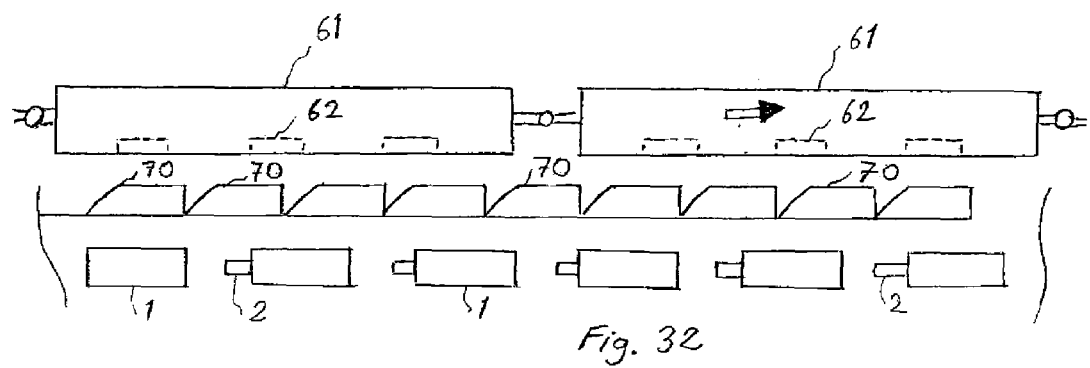
FIG. 32 shows a top view for general. The gap devices are installed all along the platform edge for the different model trains.
Figure 33:
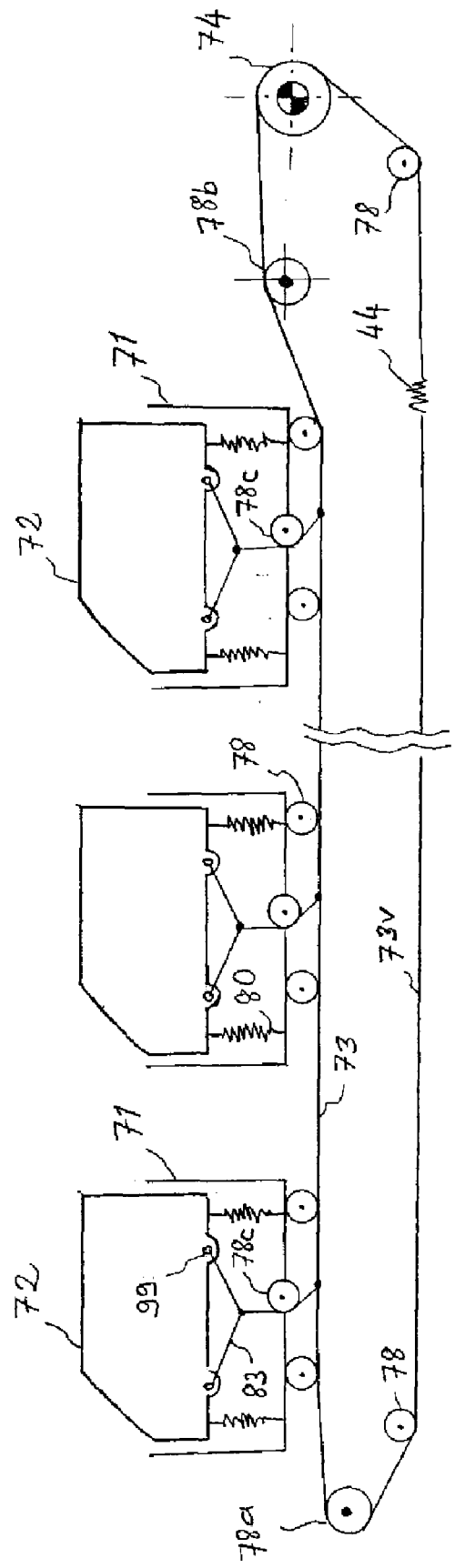
FIG. 33 shows a schematic scale in B-I. The sledges (72) connect to the closed-rope (73) by short-ropes (83) which are tied to the sledges by at least one swivel joint (99). They pass over a pulley (78c) on the middle-back of the housing; then connect to the closed-rope (73). The closed-rope is supported and guided by two pulleys (78) on the back of the housing.
Figure 34:
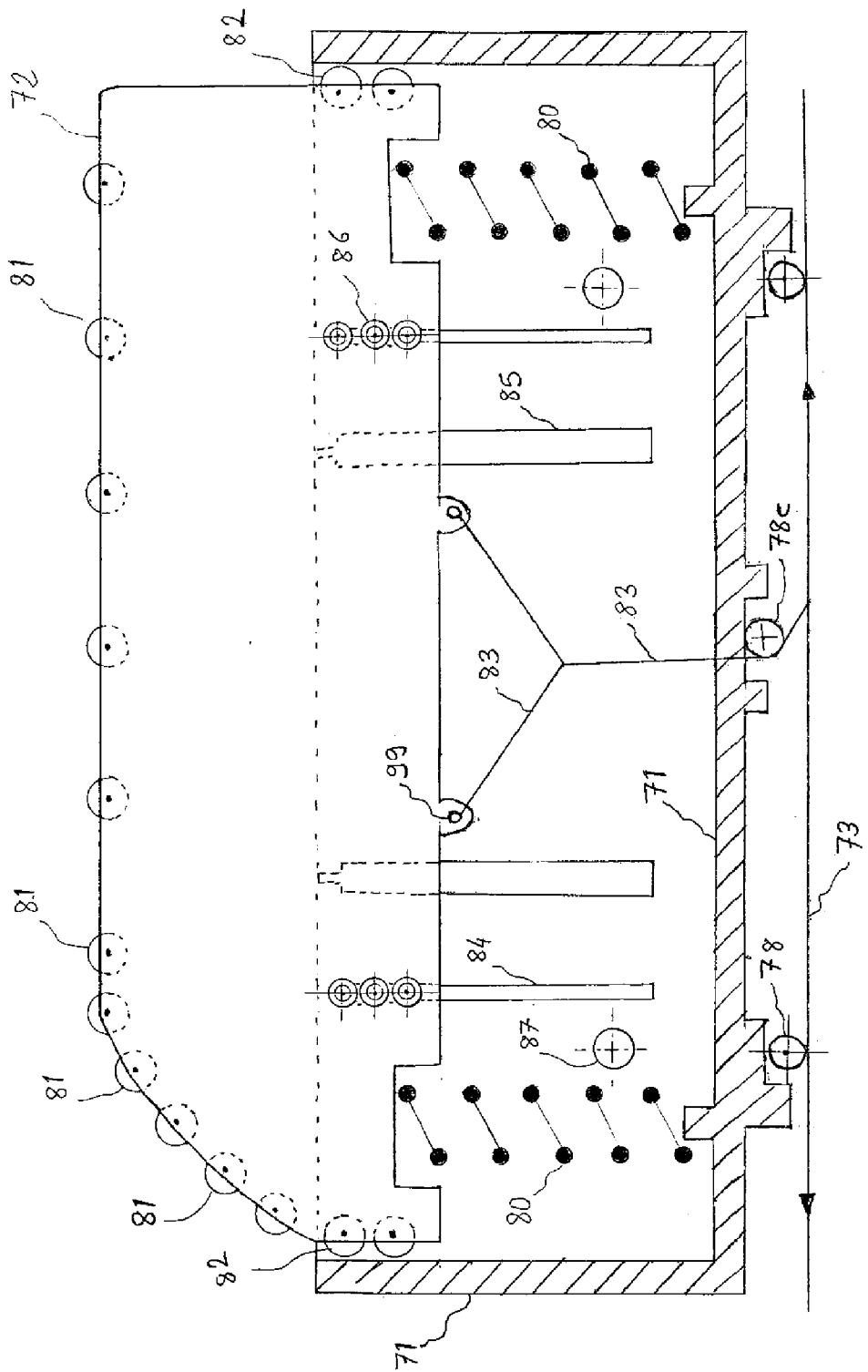
FIG. 34 shows a top view in B-I. The housing (71), the sledge (72), the rope (73), the short rope (83), the pulleys (78), the bearings (81) in oval side and in plain side, the roller bearings for guidance (82), the springs (80), the limit holes (86), the limit canals (84) and the oiling canal (85) are shown.
Figure 35:
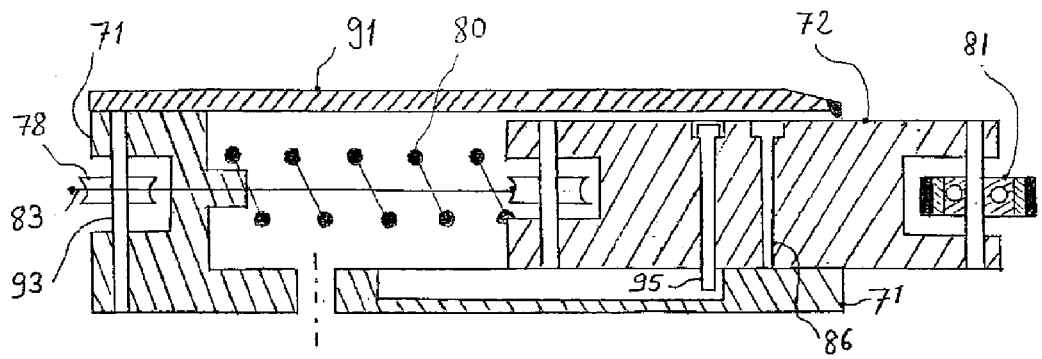
FIG. 35 shows a side sectional view in B-I. The rope (83), the pulleys (78), and the limit studs (95) the limit holes (86) and the limit canals (84) are shown.
Figure 36:
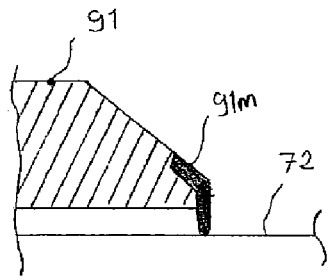
FIG. 36 shows a sectional view in B-I. A rubber seal (91m) in the end of upper cover (91).
Figure 37:
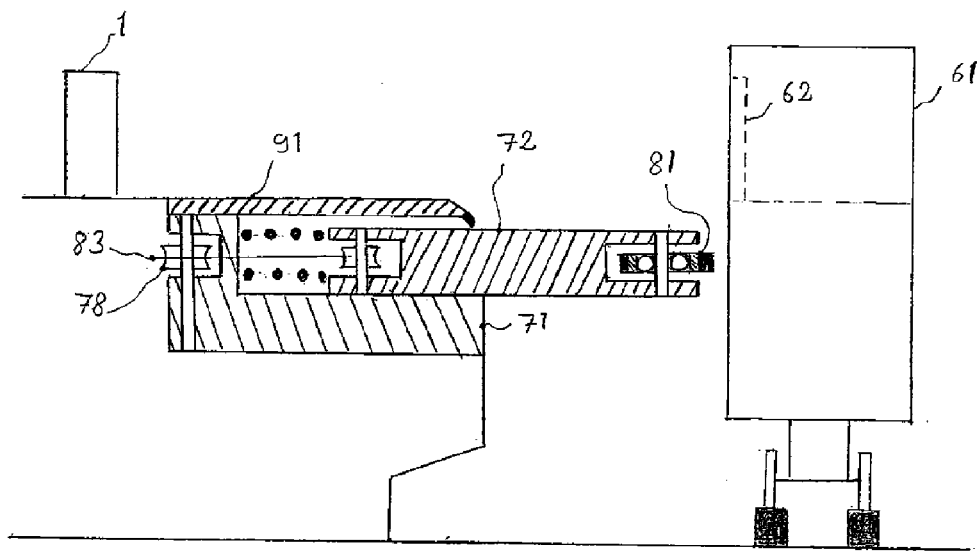
FIG. 37 shows a side view in B-I. The wall (1), the train car (61) and the gap device (70) are shown.
Figure 38:
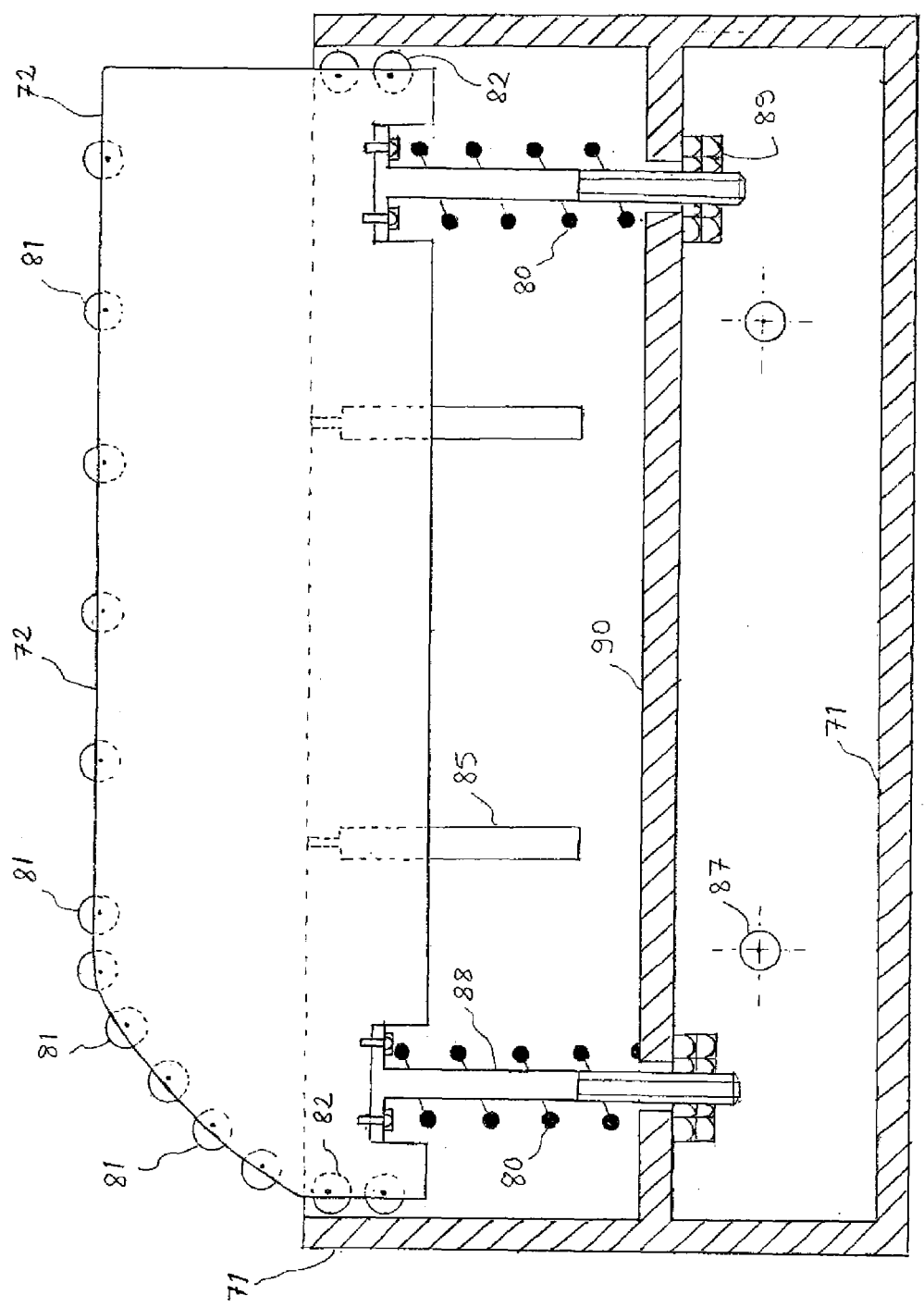
FIG. 38 shows a top view in B-III. The middle wall (90), the screw rods (88), the limit nuts (89) and the fixing holes (87) are shown.
Figure 39:
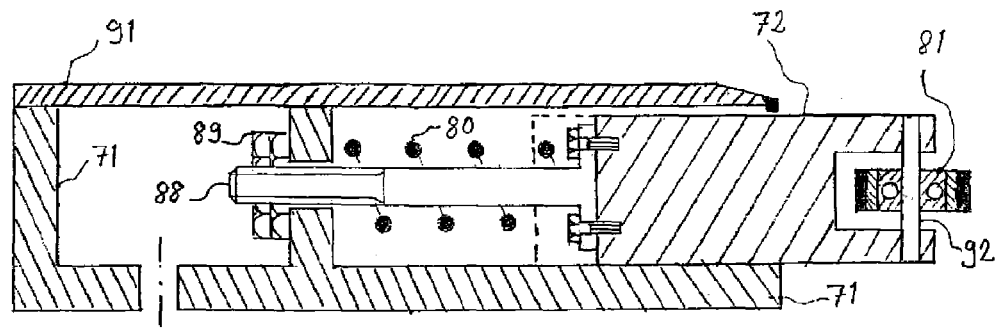
FIG. 39 shows a side sectional view in B-III. The upper cover (91), the housing (71), the sledge (72), the bearings (81) in plain side, the springs (80).
Figure 40:
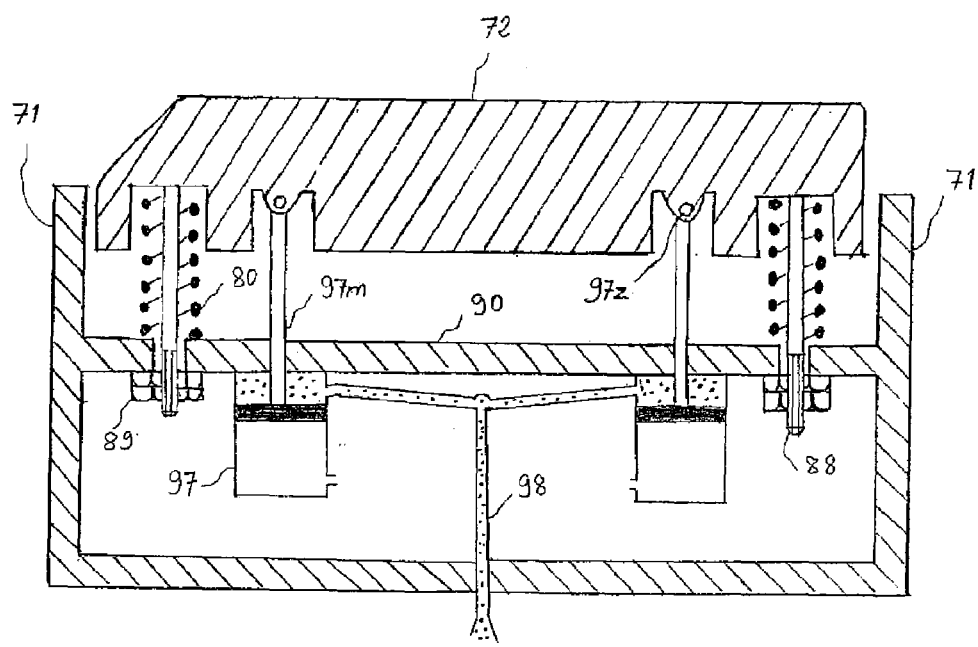
FIG. 40 shows a top view in B-II. The pneumatic/hydraulic pistons (97), the piston shafts (97m), the swivel joints (97z) the middle wall (90, the springs (80) are shown.

What is claimed is:

1. A platform system for allowing passengers to access doors of a train having a variable car types, the platform system comprising:
 a platform;
 a plurality of walls positioned along an edge of said platform, said plurality of walls arranged so as to match a position of the doors of the train, said plurality of walls having a height less than a height of the doors of the train;
 a plurality of doors positioned adjacent respectively to said plurality of walls, each of said plurality of doors being movable between an open position so as to allow the passengers to access and a closed position so as to block passengers from accessing, said plurality of doors being connected sequentially to a single rope extending in a closed circuit;
 a driving means operatively connected to said rope for moving said rope in a desired direction so as to open said plurality of doors at the same time or to close said plurality of doors at the same time, said driving means comprising:
 a v-motor;
 a drive sheave connected to said v-motor, said v-motor suitable for rotating said sheave in one direction or in an opposite direction, said drive sheave having a groove formed therein, said rope being frictionally received in said groove of said drive sheave, said plurality of walls being double-chamber walls, each of said plurality of walls having a substantially identical length, said plurality of doors comprising a pair of side-by-side doors and a pair of seating sledges positioned in the wall, said plurality of walls being at least partially split so as to define a pair of chambers having an interior wall, said pair of side-by-side doors being attached to said rope such that said driving means causes one of said pair of side-by-side doors to close in one direction while the other of said side-by-side doors closes in the opposite direction, said pair of side-by-side doors being L-shaped, said plurality of doors attaching alternately to said rope in said double-chamber walls.

2. The platform system of claim 1, said v-motor comprising a variable speed reversible motor with an adjustable frequency controller.

3. The platform system of claim 1, said v-motor comprising an electric motor having a gearbox.

4. The platform system of claim 1, said plurality of doors being supported by roller bearing positioned in the seating sledges, said rope extending over pulleys positioned in a canal at a bottom of said plurality of walls.

5. The platform system of claim 4, said canal having a cover that is flush with a floor of said platform.

6. The platform system of claim 4, said canal defined by an angle-shaped cover, said rope passing above a floor of said platform and under said angle-shaped cover.

7. The platform system of claim 1, each of said plurality of doors having a connector arm affixed to a lower end thereof, said rope being attached to the connector arm, said rope extending over a plurality of pulleys positioned on a floor of said platform.

8. The platform system of claim 1, said plurality of doors entering a nesting area in an adjacent wall of said plurality of walls when in said closed position, each of said plurality of doors having a counterweight mounted on a back of the door.

9. The platform system of claim 1, said rope having an adjacent tension spring operatively connected thereto so as to create tension in said rope.

10. The platform system of claim 1, said rope having a screw-nut with a readable scale operatively connected thereto so as to create tension in said rope.

11. The platform system of claim 1, each of said plurality of doors having a connector arm at a top thereof, said rope being connected to the connector arms, said seating sledges positioned above said plurality of doors in said plurality of walls.

12. The platform system of claim 1, further comprising:
 a first sensing means cooperative with said v-motor, said sensing means for sensing when the train stops and for sending a signal to said v-motor so as to move said plurality of doors to said open position; and
 a second sensing means cooperative with said v-motor for sensing when a last car of the train is leaving the platform and for sending a signal to said v-motor so as to move said plurality of doors to said closed position.

13. The platform system of claim 1, further comprising:
 a plate weight safety sensor positioned on said platform so as to sense when a weight over a pre-defined amount has passed thereacross, said platform weight safety sensor suitable for sending a signal to said v-motor so as to move said plurality of doors to said closed position.

14. The platform system of claim 1, further comprising:
 a door lever affixed at one side of each of said plurality of walls and each of said plurality of doors so as to allow a manual opening of said plurality of doors.

15. The platform system of claim 1, further comprising:
 an inner door installed inside each door of said plurality of doors, said rope being connected to the inner doors, said rope extending through a channel along said platform.

16. The platform system of claim 1, further comprising:
 a light curtain safety sensor positioned at ends of said platform so as to scan an area between the train and said double-chamber walls so as to stop said plurality of doors from moving to said closed position; and
 a plate weight safety sensor positioned in said area between the train and said double chamber walls so as to stop said plurality of doors from moving to said closed position.

* * * * *